(12) United States Patent
Chae et al.

(10) Patent No.: US 7,089,814 B2
(45) Date of Patent: Aug. 15, 2006

(54) APPARATUS FOR INSPECTING RUBBING INFERIORITY OF ALIGNMENT FILM OF LIQUID CRYSTAL DISPLAY DEVICE

(75) Inventors: Kyung-Su Chae, Gyeongsangbuk-Do (KR); Hyun-Ho Song, Gyeongsangbuk-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/745,640

(22) Filed: Dec. 29, 2003

(65) Prior Publication Data
US 2004/0134290 A1 Jul. 15, 2004

(30) Foreign Application Priority Data
Dec. 31, 2002 (KR) .................. 10-2002-0088446

(51) Int. Cl.
*G01N 19/00* (2006.01)
(52) U.S. Cl. .................... 73/865.9; 73/865.8; 73/865.5
(58) Field of Classification Search ............... 73/865.9, 73/865.8, 865.5
See application file for complete search history.

(56) References Cited

U.S. PATENT DOCUMENTS

| | | | | |
|---|---|---|---|---|
| 5,944,581 A | * | 8/1999 | Goenka | 451/39 |
| 6,383,329 B1 | * | 5/2002 | Agarwala et al. | 156/344 |
| 6,503,581 B1 | * | 1/2003 | Shibue et al. | 428/1.1 |
| 6,586,104 B1 | * | 7/2003 | Matsuda et al. | 428/447 |
| 6,740,370 B1 | * | 5/2004 | Shibue et al. | 428/1.1 |
| 6,831,297 B1 | * | 12/2004 | Arao | 257/59 |
| 6,853,435 B1 | * | 2/2005 | Tanaka et al. | 349/177 |
| 2002/0063834 A1 | * | 5/2002 | Sawasaki et al. | 349/130 |
| 2003/0057450 A1 | * | 3/2003 | Arao | 257/200 |
| 2004/0066556 A1 | * | 4/2004 | Dontula et al. | 359/599 |

* cited by examiner

*Primary Examiner*—Hezron Williams
*Assistant Examiner*—Rodney Frank
(74) *Attorney, Agent, or Firm*—Birch, Stewart, Kolasch & Birch, LLP

(57) ABSTRACT

An apparatus for inspecting rubbing inferiority of an alignment film of a liquid crystal display device by spraying moisture particles, the apparatus including a moisture storing unit for storing moisture, and a moisture particle generating unit for pelletizing moisture ejected from the moisture storing unit and spraying on a substrate.

21 Claims, 3 Drawing Sheets

APPARATUS FOR INSPECTING RUBBING INFERIORITY OF ALIGNMENT FILM OF LIQUID CRYSTAL DISPLAY DEVICE

This application claims priority of Korean application no. 88446/2002 filed Dec. 31, 2002, the entire contents of which are hereby incorporated by reference.

BACKGROUND OF THE INVENTION

1. Field of the Invention

The invention relates to a liquid crystal display device, and more particularly, to an apparatus for correctly inspecting rubbing inferiority of an alignment film after the alignment film is formed.

2. Description of the Related Art

Various portable electric devices such as mobile phones, personal digital assistants (PDA), and notebook computers have recently been developed. Therefore, the need for a flat panel displays used in small, light weight, power- efficient and portable devices has correspondingly increased. To meet this need, flat panel display device technologies such as liquid crystal display (LCD) technology, plasma display panel (PDP) technology, field emission display (FED) technology, and vacuum fluorescent display (VFD) technology have been actively researched. Of these flat panel display devices, the LCD is preferred due to current mass production, efficient driving schemes, and superior image quality.

FIG. 1 is a schematic view showing a sectional surface of a general LCD device in accordance with the related art. As shown in FIG. 1, the LCD 1 contains a lower substrate 5, an upper substrate 3, and a liquid crystal layer 7 formed between the lower substrate 5 and the upper substrate 3. The lower substrate 5 and the upper substrate 3 are separated by a spacer 9. The lower substrate 5 is a driving device array substrate. Multiple of pixels (not shown) are formed on the lower substrate 5, and a driving device such as a thin film transistor (TFT) is formed on each pixel. The upper substrate 3 can be a color filter substrate, and a color filter layer for realizing color is formed thereon. Further, a pixel electrode and a common electrode are formed on the lower substrate 5 and the upper substrate 3, respectively. An alignment film 6 is formed on the lower substrate 5 and the upper substrate 3 to align liquid crystal molecules of the liquid crystal layer 7 uniformly.

Liquid crystal molecules are arranged on the alignment film 6 along a direction of grooves formed through a rubbing process, and an initial alignment direction and a pretilt angle of the liquid crystal molecules are determined by the rubbing process.

Generally, a rubbing inferiority inspection using moisture is performed after an alignment film rubbing process.

FIG. 2 is an apparatus for inspecting rubbing inferiority of an alignment film of a liquid crystal display device in accordance with the related art. As shown, the related rubbing inferiority inspection was performed by spraying minute moisture particles 17 on an alignment film 14 formed on a substrate 15, followed by checking the stain of the moisture 17 sprayed on the alignment film 14.

The moisture particles 17, i.e., aerosol, are sprayed on the substrate 15 through a pipe 13, and the minute moisture particles 17 are generated from a separately provided alignment film rubbing inferiority inspecting apparatus 10.

The alignment film rubbing inferiority inspecting apparatus 10 includes moisture storing unit 11 and a moisture particle generating unit 12 for pelletizing, i.e., aerosolizing, moisture ejected from the moisture storing unit 11, and then spraying on the substrate 15 through the pipe 13. Although not shown, the moisture particle generating unit 12 includes a heater for heating moisture, and a filter through which vaporized moisture passes. Moisture particles are formed by passing through the filter, and the moisture particles are ejected out of the pipe using $N_2$ to thus be sprayed on the substrate.

However, in the conventional alignment film rubbing inferiority inspecting apparatus 10, since a length of the pipe 13 through which the moisture particles pass is long, the moisture particles agglomerate while passing through the pipe. Accordingly, even if uniform moisture particles are generated from the moisture particle generating unit 12, the size of the moisture particles 17 substantially sprayed on the substrate 15 is not uniform, thereby causing difficulty in correctly inspecting for rubbing inferiority.

Since the moisture particle generating unit 12 also requires the heater, the filter, etc., the alignment film rubbing inferiority inspecting apparatus has a voluminous space.

SUMMARY OF THE INVENTION

Therefore, an object of the invention is to provide an alignment film rubbing inferiority inspecting apparatus which can correctly inspect rubbing inferiority.

Another object of the invention is to provide an alignment film rubbing inferiority inspecting apparatus which can reduce the volume of the equipment and thus enhance space efficiency.

To achieve these and other advantages and in accordance with the purpose of the invention, the invention, in part, provides an apparatus for inspecting rubbing inferiority of an alignment film of a liquid crystal display device by spraying moisture particles. The apparatus includes a moisture storing unit for storing moisture, and a moisture particle generating unit for pelletizing (aerosolizing) moisture ejected from the moisture storing unit and for spraying on a substrate.

The invention, in part, pertains to an apparatus for inspecting rubbing inferiority of an alignment film of a liquid crystal display device by spraying moisture particles. This apparatus includes a moisture storing unit for storing moisture, a moisture particle generating unit for pelletizing (aerosolizing) moisture ejected from the moisture storing unit and spraying on a substrate unit. The apparatus can also include a filter having a pore size corresponding to tens of μm are formed, and the apparatus can have a pipe for connecting the moisture storing unit and the moisture particle generating unit.

The invention, in part, pertains to a method for detecting rubbing inferiority, which includes providing an apparatus having a moisture storing unit for storing moisture, and a moisture particle generating unit for pelletizing moisture; spraying the palletized moisture on a substrate; and visually inspecting the substrate.

The invention, in part, pertains to an inspection method for detecting rubbing inferiority, which includes providing an apparatus having a moisture storing unit for storing moisture, a moisture particle generating unit for pelletizing moisture ejected from the moisture storing unit, the moisture particle generating unit including a filter with pores having a size of tens of μm, and a pipe for connecting the moisture storing unit and the moisture particle generating unit; spraying the palletized moisture on a substrate; and visually inspecting the substrate.

The foregoing and other objects, features, aspects and advantages of the invention will become more apparent from the following detailed description of the invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to the preferred embodiments of the invention, examples of which are illustrated in the accompanying drawings.

Figure 1:
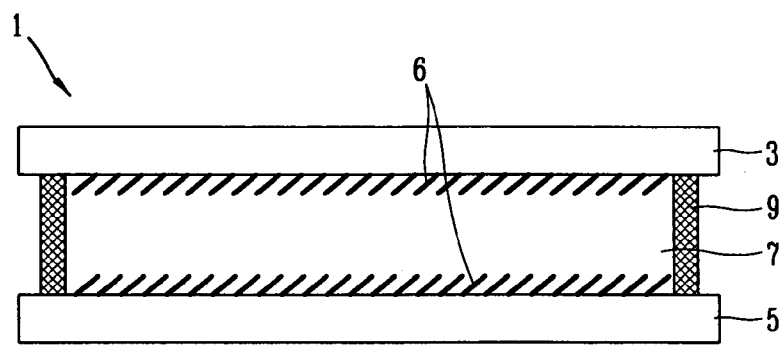
FIG. 1 is a sectional view showing a liquid crystal display device in accordance with the related art.
Figure 2:
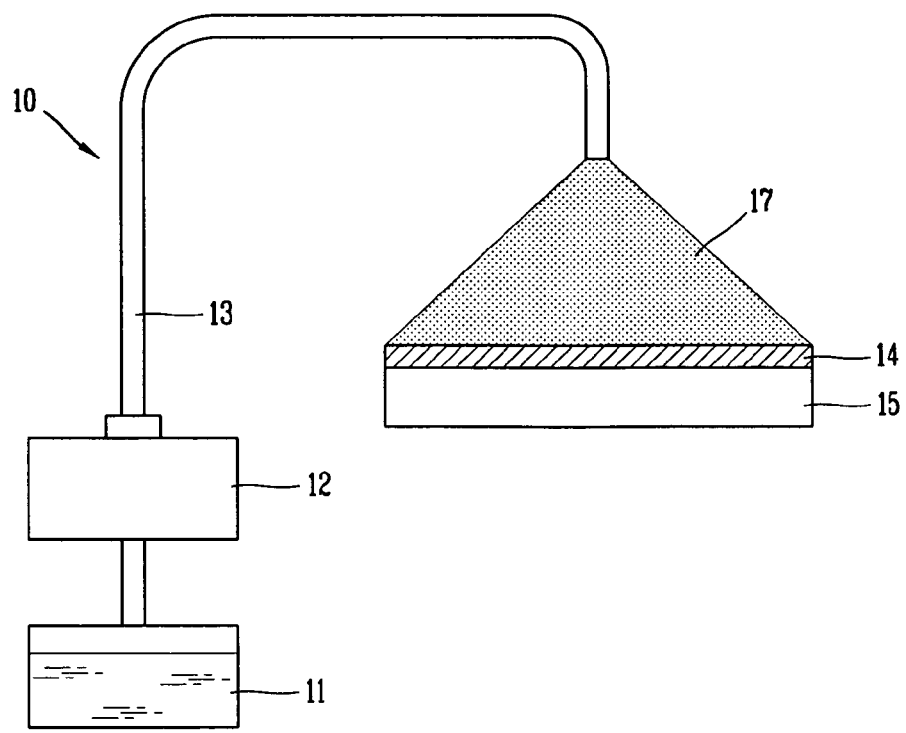
FIG. 2 is a view showing an apparatus for inspecting rubbing inferiority of an alignment film of a liquid crystal display device in accordance with the related art.
Figure 3:
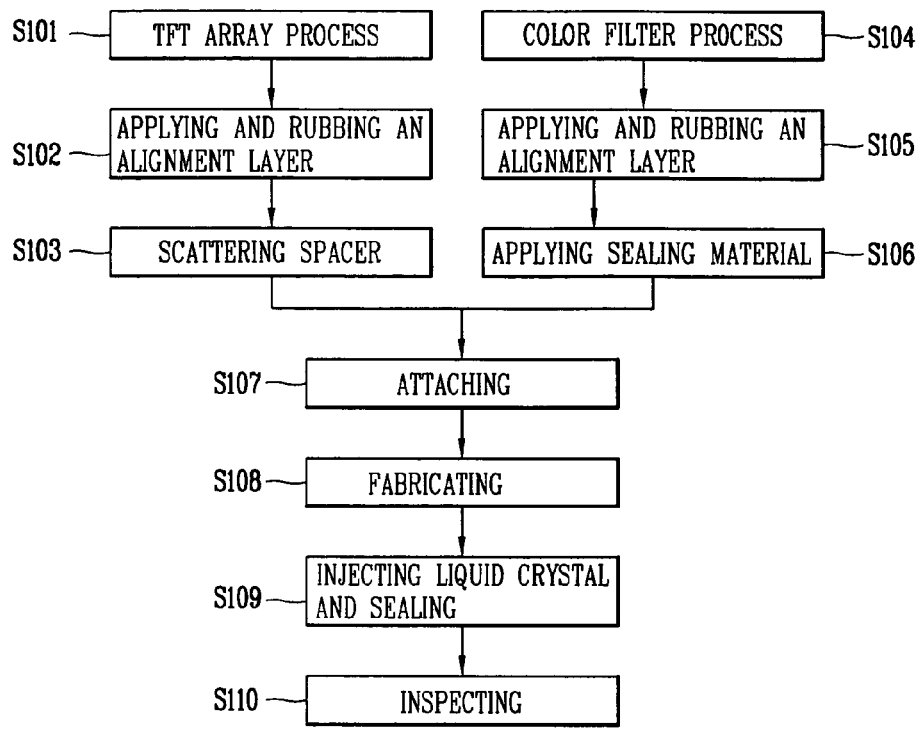
FIG. 3 is a view showing a process order flow diagram of the inventive liquid crystal display device.

The fabrication processes of a liquid crystal display device are generally divided into a driving device array substrate process for forming a driving device on a lower substrate, a color filter process for forming a color filter on an upper substrate, and a cell process. The processes of a liquid crystal display device will be explained with reference to FIG. 3.

Multiple gate lines and data lines are initially arranged on the lower substrate to define a pixel area by the driving device array process, and the thin film transistor connected to the both gate line and the data line is formed on each pixel area (S101). Also, a pixel electrode, which connects to the thin film transistor to drive the liquid crystal layer according to a signal applied through the thin film transistor, is formed by the driving device array process.

At the same time, R(Red), G(Green), and B(Blue) color filter layers for realizing the color and a common electrode are formed on the upper substrate by the color filter process (S104).

In addition, the alignment film is formed on the lower substrate and the upper substrate, respectively. Then, processes for forming the alignment film S102 and S105 include a process for applying a thin film of high polymer and a rubbing process. The thin film of high polymer is generally used as the alignment film, and polyimide based organic alignment film of organic material is mainly used for the alignment film. The alignment film must be applied to the upper and lower substrates entirely and uniformly, and the rubbing must also be also uniform.

The rubbing process rubs the alignment film in a constant direction by using cloth, and liquid crystal molecules are arranged according to the rubbing direction. The rubbing process determines an initial arrangement direction of the liquid crystal molecules and enables normal liquid crystal driving. Also, by the rubbing process, the liquid crystal display device has uniform display characteristics.

Thereafter, a spacer for maintaining a cell gap constant and uniform is dispersed on the lower substrate. A sealing material is then applied on an outer portion of the upper substrate to attach the lower substrate to the upper substrate by compression (S103, S106, and S107). The lower substrate and the upper substrate can be made from a glass substrate of larger area. That is, the large glass substrate includes multiple unit panel areas on which the driving device (such as a TFT) and the color filter layer are formed. To fabricate the individual liquid crystal unit panel, the assembled glass substrate should be cut into unit panels (S108). Thereafter, the liquid crystal is injected into the empty individual liquid crystal unit panel through a liquid crystal injection opening (S109). The liquid crystal unit panel filled with the liquid crystal is completed by sealing the liquid crystal injection opening, and each liquid crystal unit panel is inspected (S110).

The liquid crystal display device fabricated by this processes uses an electrooptic effect. The electrooptic effect is determined by anisotropy and arrangement state of liquid crystal molecules. The liquid crystal can have either a positive or negative dielectric anisotropy. A liquid crystal having positive dielectric anisotropy will align with the molecular axis approximately parallel to an applied electric field. A liquid crystal having negative dielectric anisotropy will align with the molecular axis approximately normal to an applied electric field. The degree of alignment will depend on the order parameter S of the liquid crystalline material, where $S=0.5<3\cos^2\theta-1>$ with $\theta$ being the angle between the director and the long axis of each molecule. A typical liquid crystal having positive dielectric anisotropy is cyanopentylbiphenyl (CPB), and a typical liquid crystal having negative dielectric anisotropy is methoxybenzylidene-n-butylaniline (MBBA). Accordingly, the process for applying alignment film and the rubbing process are very important processes in determining a display grade of the liquid crystal display device.

Figure 4:
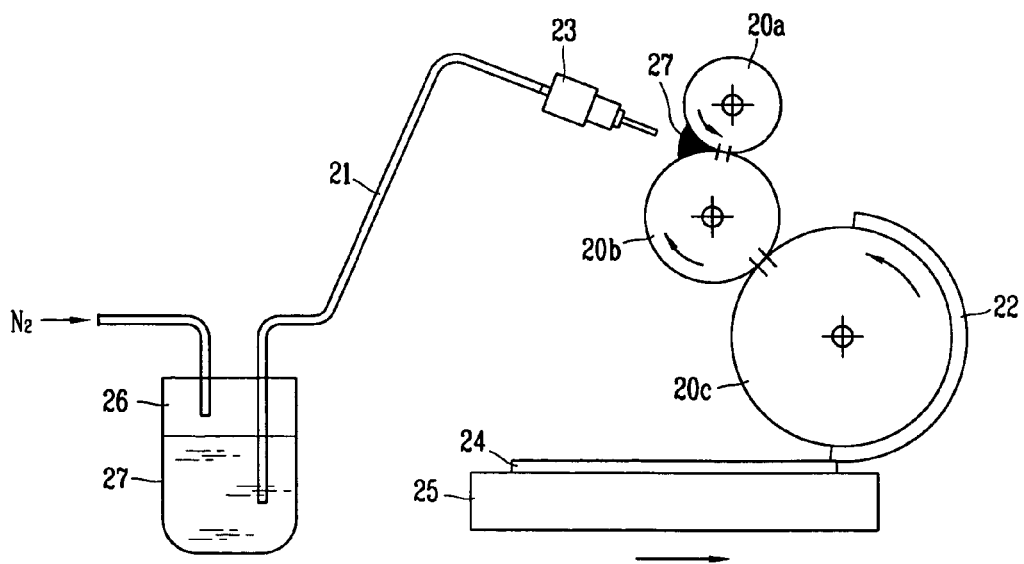
FIG. 4 shows a device for forming an alignment film according to the invention.

FIG. 4 shows an alignment film forming device according to an embodiment of the invention. As shown, an alignment film 24 is applied on a substrate 25 by a printing device composed of rollers 20a, 20b, and 20c. However, different arrangements of rollers can be used.

First, $N_2$ gas is supplied to an alignment liquid storing unit 26 containing an alignment liquid 27 (supplied from outside), and pressure is generated in the alignment liquid storing unit 26 by the supplied $N_2$ gas, and thus the alignment liquid 27 is supplied to a dispenser 23 through an alignment liquid supply pipe 21. The alignment liquid 27 injected into the dispenser 23 is applied between an anylox roll 20b and a cylindrical doctor roll 20a, and as the anylox roll 20b and the doctor roll 20a are simultaneously rotated, the alignment liquid 27 is uniformly applied to the entire surface of the anylox roll 20b. At this time, the alignment liquid applied to the surface of the anylox roll 20b is transferred to a rubber plate 22 of a printing roll 20c which is rotated by being engaged to the anylox roll 20b, and the alignment liquid transferred on the rubber plate 22 of the printing roll 20c is re-transferred to the substrate 25, thereby forming the alignment film 24. After uniformly applying the alignment film 24 on the substrate 25, minute grooves are formed on the alignment film 24 by the rubbing process.

As discussed above, the rubbing process determines the initial arrangement state of the liquid crystal molecules, and the uniform rubbing on the entire alignment film determines the display grade of the liquid crystal display device. Accordingly, an alignment film inspection to determine inferior rubbing must be performed after the rubbing process and before the sealing material is applied. The alignment film inspection is performed by spraying moisture particles (aerosol) on the rubbed alignment film with the alignment film rubbing inferiority inspection apparatus and then visually checking the stain. The visual inspection is preferably performed using the naked eye, but video monitoring, microscopic inspection or telescopic inspection can also be used. That is, stain generated at an inferiorly rubbed region appears different from stain generated at a normally rubbed region.

Figure 5:
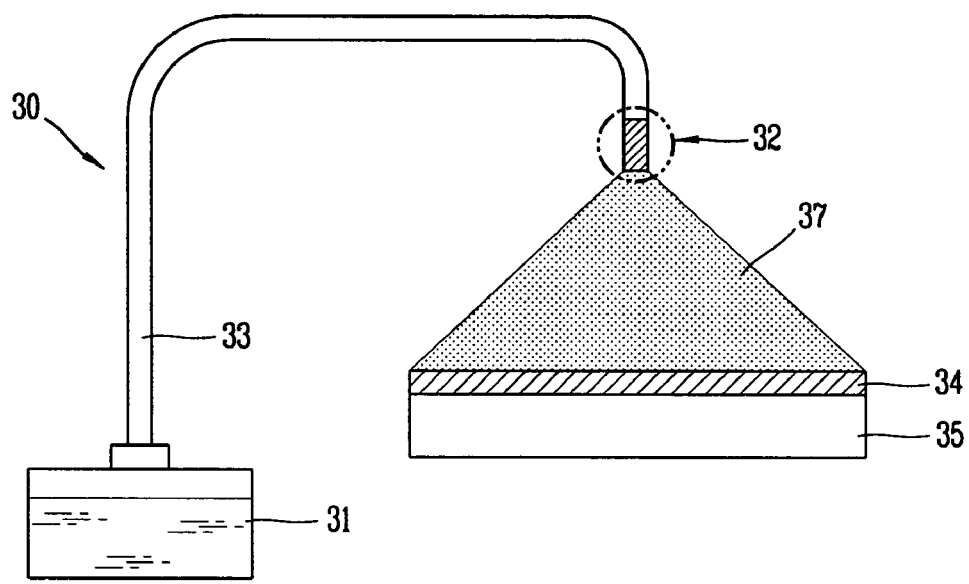
FIG. 5 shows an apparatus for inspecting rubbing inferiority of an alignment film of a liquid crystal display device according to the invention.

FIG. 5 shows a rubbing inspection using an alignment film rubbing inferiority inspecting apparatus according to an embodiment of the invention. As shown, the rubbing inspection is performed by minute moisture particles 37 ejected from an alignment film rubbing inferiority inspection apparatus 30 on a substrate 35 where an alignment film 34 is applied. Although not shown, the substrate 35 corresponds to upper and lower substrates. On the upper substrate, a thin film transistor, a pixel electrode, and etc are formed, and on the lower substrate, a color filter, a common electrode, and etc. are formed.

The minute moisture particles 37 sprayed onto the alignment layer 34 have approximately the same size, and are generated from the alignment film rubbing inferiority inspecting apparatus 30 of the invention.

The alignment film rubbing inferiority inspecting apparatus 30 of the invention includes a moisture storing unit 31 for storing moisture, and a moisture particle (aerosol) generating unit 32 for pelletizing (aerosolizing) moisture ejected from the moisture storing unit and spraying. The aerosolized particles have approximately the same size. The moisture particle generating unit 32 sprays the moisture particles having the same size on the alignment film 34 applied on the substrate 35.

If $N_2$ gas is supplied to the moisture storing unit 31 where moisture is stored, a pressure is generated inside the moisture storing unit 31. The moisture is then supplied to the moisture particle generating unit 32 through a pipe 33 which connects the moisture storing unit 31 and the moisture particle generating unit 32. The moisture supplied to the moisture particle generating unit 32 passes a filter where pores having a size of tens of μm are formed thus to be aersolized, and is sprayed on the alignment film 34 with the $N_2$ gas. At this time, since the moisture particles sprayed through the filter have the same size, the alignment film rubbing inferiority inspection can be correctly performed.

Nitrogen is used as the carrier gas. However, other appropriate carrier gases can be used, such as helium, argon, or air.

Figure 6:
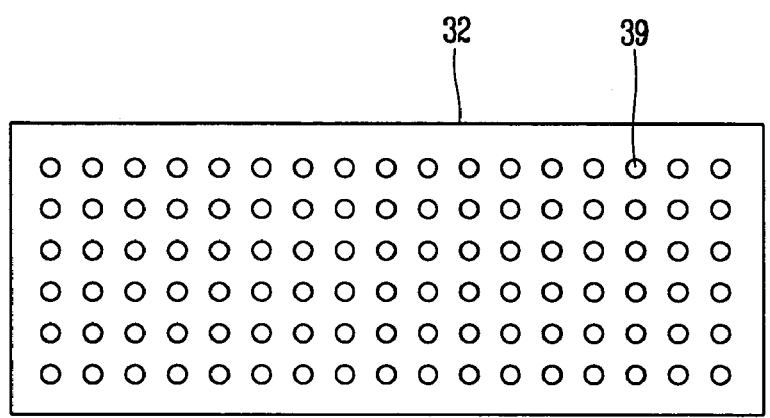
FIG. 6 shows a plan view of a filter for a moisture particle generating unit according to the invention.

FIG. 6 shows a plan of the filter of the moisture particle generating unit 32. As shown, since the pores 39 of the same size corresponding to tens of μm are formed in the moisture particle generating unit 32, the moisture ejected with the $N_2$ gas along the pipe passes the holes 39 thus to be palletized, i.e., aerosolized, with the same size. According to this, the moisture particles sprayed on the substrate through the holes 39 have the same size.

The pores 39 have the same size, corresponding to tens of μm. This means the pores can be of the same size in the range of 10–200 μm, 20–180 μm, 30–170 μm, 40–160 μm or 50–150 μm. The filter can be made of any appropriate material, such as stainless steel, nylon, PVDF (polyvinylidene difluoride), polypropylene or Teflon (polytetrafluoroethylene).

The moisture storage unit 31 is charged with water, preferably deionized water. The water can also contain other components to, for example, modify the surface tension. These components can be alcohols or surfactants. Also, a non-aqueous liquid can be charged into the storage unit 31.

The alignment film rubbing inferiority inspecting apparatus does not require a heater for generating the moisture particles, thereby reducing the volume of equipment. Also, since the moisture generating unit is located at the end portion of the pipe, the moisture particles are prevented from being united to each other in the pipe.

The invention provides an alignment film rubbing inferiority inspecting apparatus for inspecting rubbing inferiority of the alignment film. In the conventional alignment film rubbing inferiority inspecting apparatus, however, the heater and filter are provided in the moisture particle generating unit to thus have a voluminous space of the equipment. Also, the conventional moisture particle generating unit is located at the center of the pipe, and the moisture particles are ejected, so that the moisture particles generated from the moisture particle generating unit unite to each other while passing through the pipe before being sprayed on the substrate. Therefore, the moisture particles had different sizes in the related art apparatus. That is, since the moisture particles sprayed on the substrate were not uniform, the rubbing inferiority could not be correctly performed. On the other hand, in the invention, the heater of the moisture particle generating unit is removed to thus enhance space efficiency, and the moisture particle generating unit is arranged at the end portion of the pipe close to the substrate to thus spray moisture particles having the same size on the substrate, thereby correctly inspecting rubbing inferiority.

As discussed above, in the invention, the moisture particle generating unit is arranged at the end portion of the pipe close to the substrate and the heater is removed, so that moisture particles having the same size are sprayed on the substrate to thus correctly inspect rubbing inferiority and enhance space efficiency.

As the invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An apparatus for forming an alignment film of a liquid crystal display device, comprising:
   means for depositing the alignment film on a substrate;
   rubbing means for rubbing the alignment film; and
   inspecting means for inspecting rubbing inferiority of the alignment film, wherein the inspecting means includes:
   a moisture storing unit for storing moisture; and
   a moisture particle generating unit for pelletizing moisture ejected from the moisture storing unit and spraying the pelletized moisture on the alignment film.

2. The apparatus of claim 1, wherein the moisture particle generating unit includes a filter having a pore size of tens of μm.

3. The apparatus of claim 1, wherein the moisture particles have a size corresponding to tens of μm.

4. The apparatus of claim 1, further comprising a pipe for connecting the moisture storing unit and the moisture particle generating unit.

5. The apparatus of claim 1, wherein the moisture particle generating unit is located at an end portion of a pipe close to a substrate.

6. An apparatus for forming an alignment film of a liquid crystal display device, comprising:
   means for depositing the alignment film on a substrate;
   rubbing means for rubbing the alignment film; and
   inspecting means for inspecting rubbing inferiority of the alignment film, wherein the inspecting means includes:
   a moisture storing unit for storing moisture;
   a moisture particle generating unit for pelletizing moisture ejected from the moisture storing unit and spraying on the alignment film, the moisture particle generating unit including a filter with pores having a size of tens of μm; and
   a pipe for connecting the moisture storing unit and the moisture particle generating unit.

7. The apparatus of claim 6, wherein the moisture particle generating unit is located at an end portion of a pipe close to a substrate.

8. An inspection method for detecting rubbing inferiority, which comprises:
   providing an apparatus comprising a moisture storing unit for storing moisture, and a moisture particle generating unit for pelletizing moisture;
   spraying the pelletized moisture on a substrate; and
   visually inspecting the substrate.

9. The method of claim 8, wherein the moisture particle generating unit includes a filter having a pore size of tens of μm.

10. The method of claim 8, wherein the moisture particles have a size corresponding to tens of μm.

11. The method of claim 8, wherein the apparatus further comprises a pipe for connecting the moisture storing unit and the moisture particle generating unit.

12. The method of claim 8, wherein the moisture particle generating unit is located at an end portion of a pipe close to a substrate.

13. An inspection method for detecting rubbing inferiority, which comprises:
   providing an apparatus comprising a moisture storing unit for storing moisture, a moisture particle generating unit for pelletizing moisture ejected from the moisture storing unit, the moisture particle generating unit including a filter with pores having a size of tens of μm, and a pipe for connecting the moisture storing unit and the moisture particle generating unit;
   spraying the pelletized moisture on a substrate; and
   visually inspecting the substrate.

14. The method of claim 13, wherein the moisture particle generating unit is located at an end portion of a pipe close to a substrate.

15. The method of claim 13, wherein the moisture particles have a size corresponding to tens of μm.

16. The apparatus of claim 1, wherein the moisture storing unit contains water.

17. The apparatus of claim 1, wherein the moisture particle generating unit includes a filter having a pore size of 10–200 μm.

18. The apparatus of claim 1, wherein the moisture particle generating unit includes a filter made from stainless steel, nylon, polyvinylidene difluoride, polypropylene or polytetrafluorethylene.

19. The apparatus of claim 6, wherein the moisture storing unit contains water.

20. The apparatus of claim 6, wherein the filter has a pore size of 10–200 μm.

21. The apparatus of claim 6, wherein the filter is made from stainless steel, nylon, polyvinylidene difluoride, polypropylene or polytetrafluorethylene.

* * * * *